(12) United States Patent
Wang

(10) Patent No.: US 8,344,634 B2
(45) Date of Patent: Jan. 1, 2013

(54) LAMP DRIVING APPARATUS AND LEVEL SHIFT DRIVING CIRCUIT

(75) Inventor: Chen-Hsung Wang, Taipei County (TW)

(73) Assignee: Green Solution Technology Co., Ltd., New Taipei (TW)

( * ) Notice: Subject to any disclaimer, the term of this patent is extended or adjusted under 35 U.S.C. 154(b) by 285 days.

(21) Appl. No.: 12/689,232

(22) Filed: Jan. 19, 2010

(65) Prior Publication Data
US 2011/0175538 A1 Jul. 21, 2011

(51) Int. Cl.
*H05B 37/02* (2006.01)
(52) U.S. Cl. ............... 315/209 R; 315/224; 315/291
(58) Field of Classification Search ........... 315/209 R, 315/224, 244, 245, 291, 302, 307, 308, 361, 315/362
See application file for complete search history.

(56) References Cited

U.S. PATENT DOCUMENTS

| | | | |
|---|---|---|---|
| 5,717,295 A * | 2/1998 | Nerone | 315/307 |
| 6,114,814 A * | 9/2000 | Shannon et al. | 315/219 |
| 6,218,788 B1 * | 4/2001 | Chen et al. | 315/225 |
| RE39,341 E * | 10/2006 | Kataoka et al. | 315/291 |
| 7,313,006 B2 * | 12/2007 | Choi | 363/56.04 |

* cited by examiner

*Primary Examiner* — Jimmy Vu
(74) *Attorney, Agent, or Firm* — Jianq Chyun IP Office

(57) ABSTRACT

A lamp driving apparatus includes a switch module, a controller, a resonant module, and a level shift circuit. The switch module includes a high side transistor switch and a low side transistor switch connected in series between an input power source and a common level. The controller controls the high side and the low side transistor switches to control the power from the input power source transmitted through the switch module. The resonant module coupled to the switch module converts the power into an AC output signal to drive a lamp. The level shift circuit generates a high side control signal based on an voltage level of a connecting node of the high side and the low side transistor switches, the level shift voltage, and a control signal generated by the controller so as to control the high transistor switch.

18 Claims, 7 Drawing Sheets

US 8,344,634 B2

LAMP DRIVING APPARATUS AND LEVEL SHIFT DRIVING CIRCUIT

BACKGROUND OF THE INVENTION

1. Field of the Invention

The invention generally relates to a lamp driving apparatus and a level shift driving circuit.

2. Description of Related Art

FIG. 1 is a schematic circuit diagram of a conventional fluorescent lamp driving circuit. A ballast controller 10 includes a high side driving circuit HSD and a low side driving circuit LSD which respectively drive a high side P-type MOSFET M1 of a switch module 40 via a high side driving pin OUT 1 and a low side N-type MOSFET M2 of a switch module 40 via a low side driving pin OUT2. The high side P-type MOSFET M1 and the low side N-type MOSFET M2 are connected with each other between an input power source VIN and a ground. The ballast controller 10 controls the high side P-type MOSFET M1 and the low side N-type MOSFET M2 to transmit power of the input power source VIN into a resonant module 30. The resonant module 30 includes an inductor L1 and a capacitor C2 to convert the power of the input power source VIN into an AC output signal so as to drive a lamp 20.

In order to ensure that the high side P-type MOSFET M1 and the low side N-type MOSFET M2 are indeed turned on or off, both of the high side driving circuit HSD and the low side driving circuit LSD require being connected between the input power source VIN and the ground simultaneously. However, because the driving voltage of the lamp 20 is several hundreds of volts, the voltage of the input power source is also in the order of hundreds of volts as well. Thus, the ballast controller 10 is required to be produced with a high voltage process, such that the process of fabricating the ballast controller 10 is difficult and the manufacturing cost thereof is increased.

SUMMARY OF THE INVENTION

Accordingly, a level shift driving circuit of an embodiment of the invention shifts a level of a control signal such that N-type MOSFETs are able to be adopted in a high side transistor and a low side transistor. Beside, the level shift driving circuit only adopts few high withstand voltage elements coupled to an input power source so as to isolate the high voltage of the input power source and prevent the high voltage from being applied on other elements. As a result, a controller of the level shift driving circuit is able to be produced by a low voltage process, such that the process of fabricating the controller is easier and the manufacturing cost thereof is reduced.

In order to achieve the above-mentioned objects, an embodiment of the invention provides a lamp driving circuit apparatus which includes a switch module, a controller, a resonant module, and a level shift circuit. The switch module includes a high side transistor switch and a low side transistor switch connected in series between an input power source and a common level. The controller is adapted to control the high side transistor switch and the low side transistor switch to control power from the input power source transmitted through the switch module. The resonant module is coupled to the switch module and converts the power from the input power source into an AC output signal so as to drive a lamp. The level shift circuit is coupled to the controller, the switch module, and a level shift voltage. The level shift circuit generates a high side control signal according to a voltage level of a connecting node of the high side transistor switch and the low side transistor switch, the level shift voltage, and a control signal generated by the controller so as to control the high transistor switch.

One embodiment of the invention also provides a level shift driving circuit for shifting a level of a control signal. The level shift driving circuit includes an energy storage path, an energy storage element, a first energy release path, and a second energy release path. The energy storage path has a first end coupled to a level shift voltage so as to transmit power of the level shift voltage. The energy storage element has a first end coupled to a second end of the energy storage path, and a second end coupled to a reference level so as to store the power of the level shift voltage. The first energy release path has a first end coupled to the first end of the energy storage element, and a second end coupled to a control end of a first transistor switch so as to turn on the first transistor switch according to the control signal. The second energy release path has a first end coupled to the control end of the first transistor switch, and a second end coupled to the reference level to release charges stored in a parasitic capacitor of the first transistor switch so as to turn off the first transistor switch.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
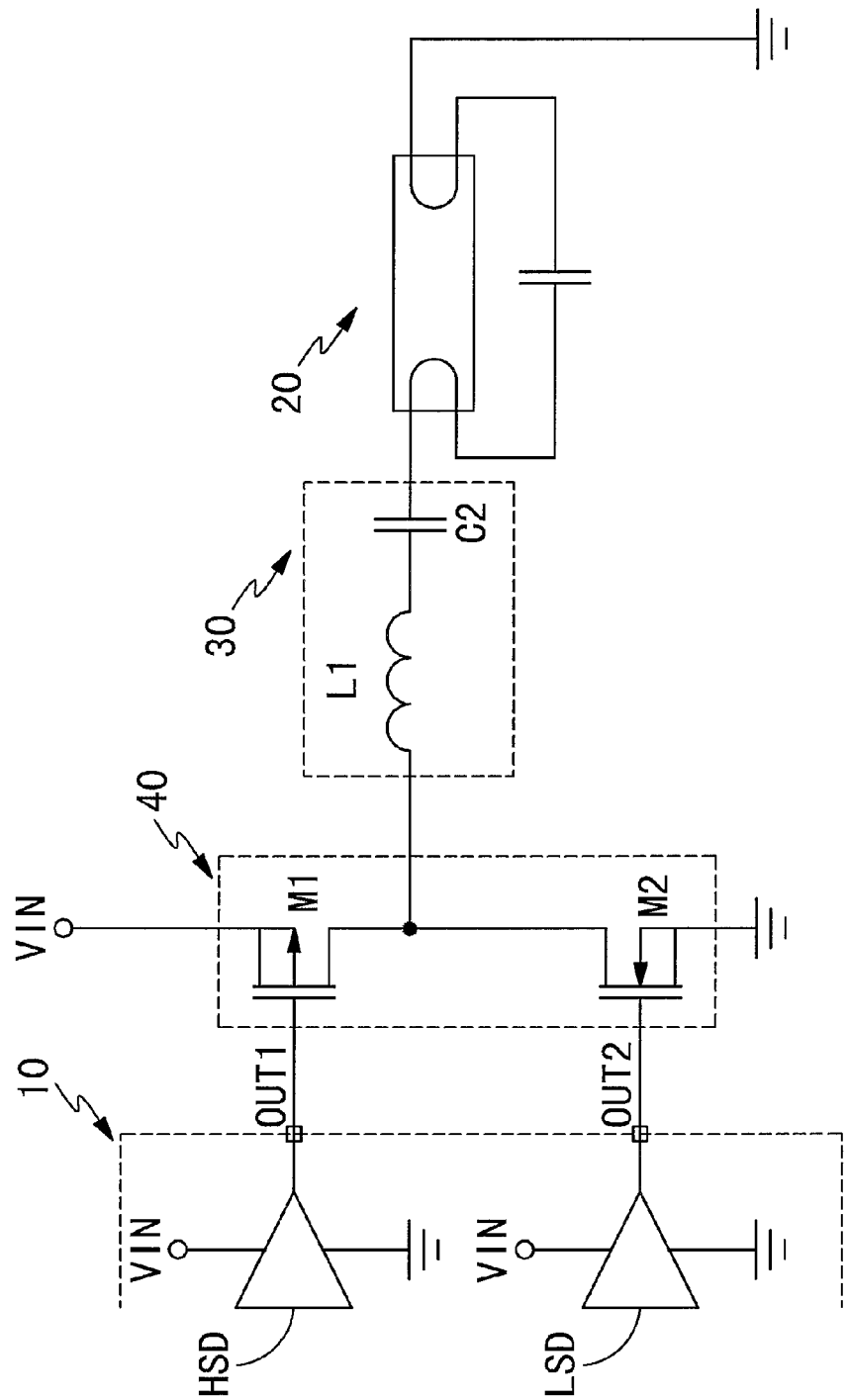
FIG. 1 is a schematic circuit diagram of a conventional fluorescent lamp driving circuit.
Figure 2:
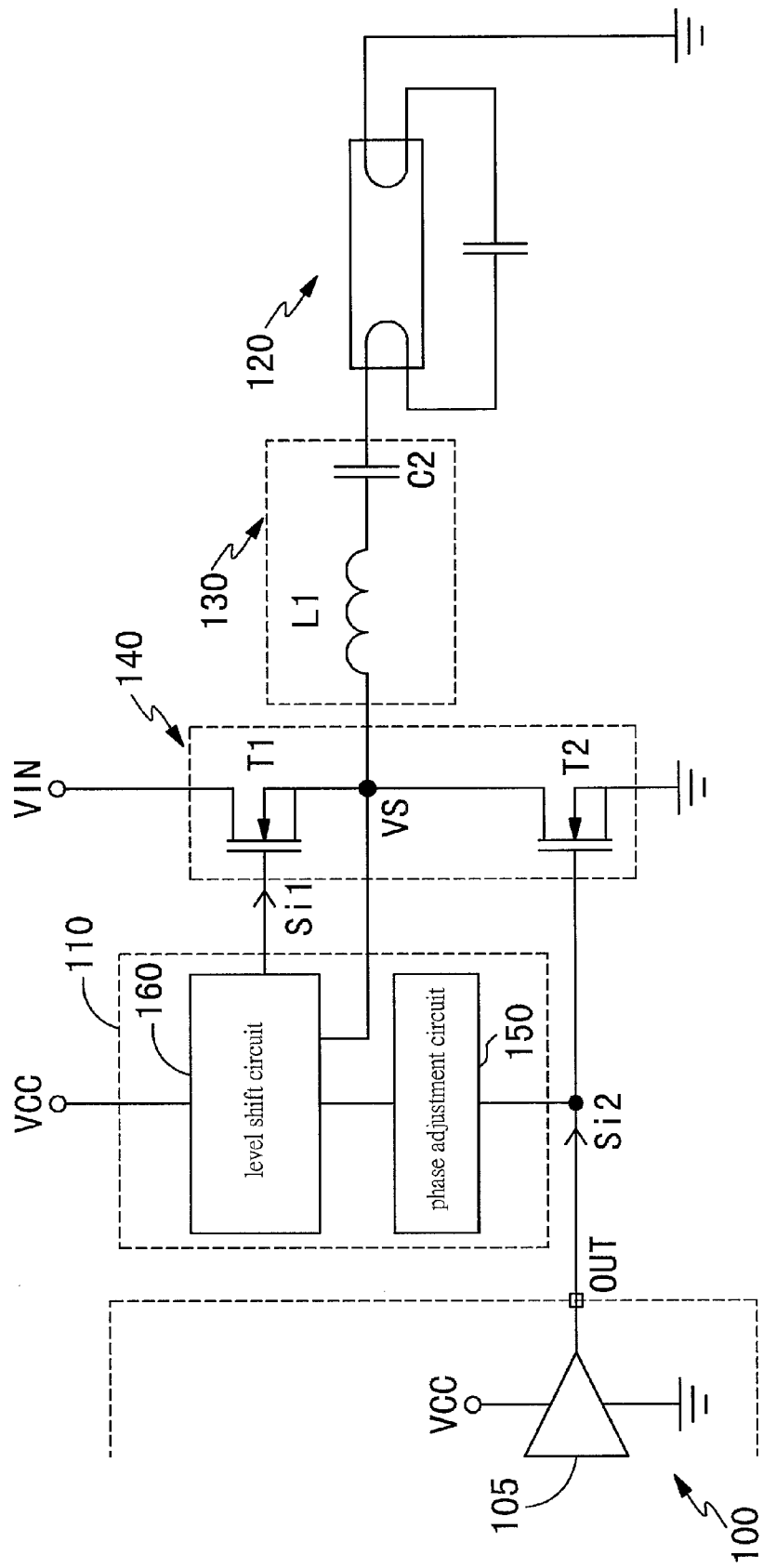
FIG. 2 is a circuit block diagram of a lamp driving apparatus according to an embodiment of the invention.

Referring to FIG. 2, FIG. 2 is a circuit block diagram of a lamp driving apparatus according to an embodiment of the invention. The lamp driving apparatus includes a controller 100, a level shift driving circuit 110, a resonant module 130, and a switch module 140 for driving a lamp 120. The controller 100 includes a driving circuit 105 coupled between a driving voltage VCC and a common level (i.e. ground) so as to output a control signal Si2 via a pin OUT according to the driving voltage VCC. The level shift driving circuit 110 includes a phase adjustment circuit 150 and a level shift circuit 160. The phase adjustment circuit 150 is coupled to the level shift circuit 160 and used to receive the control signal Si2 and adjust a phase of the control signal Si2. The switch module 140 is coupled to an input power source VIN and the common level. The switch module 140 includes a high side transistor switch T1 and a low side transistor switch T2 connected in series. In the embodiment, the high side transistor switch T1 and the low side transistor switch T2 are both N-type MOSFETs.

The level shift circuit 160 is coupled to the controller 100, a connecting node VS of the high side transistor switch T1 and the low side transistor switch T2 of the switch module 140, and a level shift voltage. In the embodiment, the driving voltage VCC serves as the level shift voltage. The level shift circuit 160 receives the control signal Si2 after the phase of control signal Si2 is adjusted by the phase adjustment circuit 150, and then adjusts a level of the control signal Si2 according to an voltage level of the connecting node VS of the high side transistor switch T1 and the low side transistor switch T2 and then outputs a high side control signal Si1. When the high side transistor switch T1 is turned on, the voltage level of the connecting node VS rises to a voltage level of the input power source VIN, a order of hundreds of volts, which is much higher than the voltage level of the driving voltage VCC that ranges from several volts to tens of volts. Via the level shift circuit 160, the voltage level of the high side control signal Si1 is ensured to be higher than the voltage level of the connecting node VS by a voltage difference of the driving voltage VCC so as to indeed control the switching of the high end transistor switch T1. Besides, the level shift driving circuit 110 of the invention has a plurality of elements capable of withstanding a high voltage level of the input power source VIN, such that the voltage of the connecting node VS, i.e. the input power source VIN, is isolated from the controller 100 when the high side transistor switch T1 is turned on. Thus, withstand voltage of the controller 100 only requires reaching the voltage of the driving voltage VCC. Further description is illustrated in the following.

In addition, in the embodiment, the controller 100 only outputs the control signal Si2 to control a switching of the low side transistor switch T2, and generates the high side control signal Si1 via the phase adjustment circuit 150 and the level shift circuit 160 so as to control a switching of the high side transistor switch T1. In order to prevent the high side transistor switch T1 and low side transistor switch T2 from being turned on simultaneously, the turn-on time of the high side transistor switch T1 and the turn-on time of the low side transistor switch T2 do not overlap. The phase adjustment circuit 150 is able to adjust the phase of the control signal Si2, so that the phase difference between the high side control signal Si1 and the control signal Si2 is kept at a predetermined phase difference. Herein, the phase difference of the embodiment is 180 degrees. In some applications or another embodiment, the phase adjustment circuit 150 may be omitted when the controller 100 is able to output two control signals having inverse phases with each other or the level shift circuit 160 has a phase-inversing function.

Figure 3:
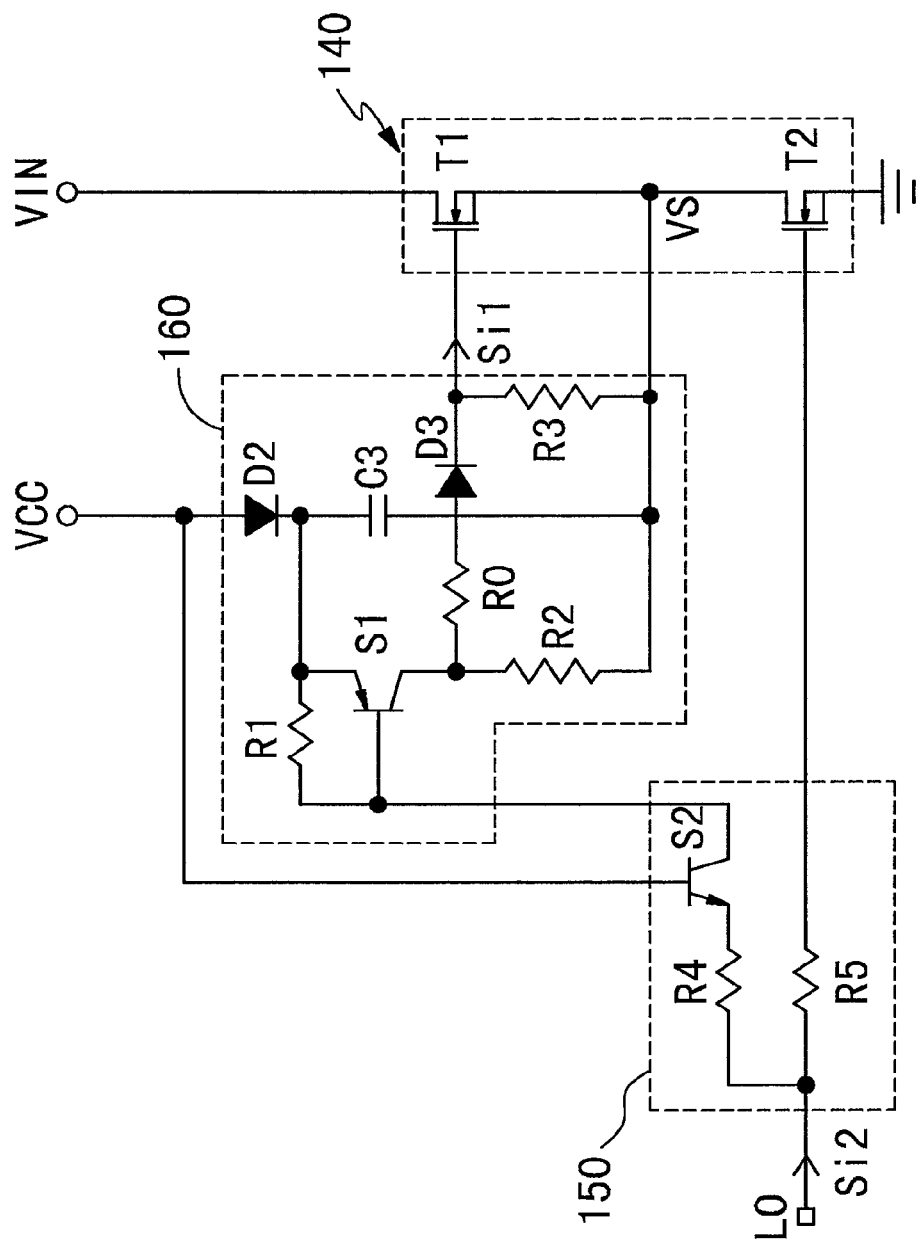
FIG. 3 is a schematic circuit diagram of a level shift driving circuit according to the first embodiment of the invention.

FIG. 3 is a schematic circuit diagram of the level shift driving circuit according to the first embodiment of the invention. Referring to FIG. 3, the level shift driving circuit includes the phase adjustment circuit 150 and the level shift circuit 160. The phase adjustment circuit 150 includes resistors R4 and R5, and an NPN bipolar transistor S2. An end of the resistor R4 and an end of the resistor R5 are connected with each other and receive the control signal Si2 from a low side driving pin LO. Another end of the resistor R5 is connected with a gate (control end) of the low side transistor switch T2 to control the switching of the low side transistor switch T2 according to the control signal Si2. Another end of the resistor R4 is connected with an emitter of the NPN bipolar transistor S2. A base of the NPN bipolar transistor S2 is connected with the driving voltage VCC, and a collector of the NPN bipolar transistor S2 is connected with the level shift circuit 160.

The level shift circuit 160 includes resistors R0, R1, R2, and R3, a capacitor C3, a PNP bipolar transistor S1, and diodes D2 and D3. A positive end of the diode D2 is connected with the driving voltage VCC, and a negative end of the diode D2 is connected with the resistor R1, an emitter of the PNP bipolar transistor S1, and an end of the capacitor C3. Another end of the resistor R1 is connected with the collector of the NPN bipolar transistor S2 and a base of the PNP bipolar transistor S1. Another end of the capacitor C3 is connected with the connecting node VS of the high side transistor switch T1 and the low side transistor switch T2. A collector of the PNP bipolar transistor S1 is connected with an end of the resistor R0 and an end of the resistor R2. Another end of the resistor R2 is connected with the connecting node VS, and another end of the resistor R0 is connected with a positive end of the diode D3. A negative end of the diode D3 is connected with the gate of the high side transistor switch T1 and an end of the resistor R3. Another end of the resistor R3 is connected with the connecting node VS.

The diode D2 of the level shift circuit 160 serves as an energy storage path to transmit power of the driving voltage VCC to an energy storage element, i.e. the capacitor C3, such that the capacitor C3 is able to provide the voltage level for level shifting and power for switching the high side transistor switch T1. The PNP bipolar transistor S1, the resistors R0~R2, and the diode D3 serve as a first energy release path, such that the voltage of the capacitor C3 is applied on the gate of the high side transistor switch T1, and thus the high side transistor switch T1 is turned on. The resistor R3 serves as a second energy release path, such that charges stored in a parasitic capacitor of the first transistor switch T1 is released through the resistor R3, and thus the first transistor switch T1 is turned off.

Operation of the phase adjustment circuit 150 and the level shift circuit 160 are illustrated as follows. When the control signal Si2 is at a high level state (i.e., equals to the voltage level of the driving voltage VCC), the low side transistor switch T2 is turned on so that the voltage level of the connecting node VS is zero. Since the voltage level of the connecting node VS is zero which is lower than the driving voltage VCC, the power of the driving voltage VCC is stored in the capacitor C3 via the diode D2 until the cross voltage of the capacitor C3 equals to the driving voltage VCC minus the forward-biased voltage of the diode D2. Furthermore, since both the voltage level of the base and the emitter of the NPN bipolar transistor S2 equals to that of the driving voltage VCC, the NPN bipolar transistor S2 is cut off, so that the resistor R1 has no current passing through. Thus, the voltage levels at two ends of the resistor R1 are equal, i.e. both the voltage levels of the base and the emitter of the PNP bipolar transistor S1 being equal, so that the PNP bipolar transistor S1 is also cut off. As a result, no current passes through the resistor R3 and thus the voltage levels at two ends of the resistor R3 are equal. That is to say, the voltage levels of the gate and the source of the high side transistor switch T1 are equal, and the high side transistor switch T1 is cut off. Since the PNP bipolar transistor S1 and the NPN bipolar transistor S2 are cut off, no power is transmitted from the driving voltage VCC to the PNP bipolar transistor S1 and the NPN bipolar transistor S2.

When the control signal Si2 is changed to a low level state (i.e. zero voltage), the low side transistor switch T2 is cut off.

At this time, the resistor R4 is connected with zero voltage, so that the voltage level of the emitter of the bipolar transistor S2 is pulled down and thus the bipolar transistor S2 is turned on. Since the bipolar transistor S2 is turned on, the current flows through the resistor R1 and a voltage difference is then formed thereon, so that the bipolar transistor S1 is turned on as well. At this time, the voltage of the capacitor C3, i.e. the high side control signal Si1, is applied on the high side transistor switch T1 through the PNP bipolar transistor S1, the resistor R0, and the diode D3, such that the high side transistor switch T1 is turned on. When the high side transistor switch T1 is turned on, the voltage level of the connecting node VS rises to the voltage level of the input power source VIN. Thus, the voltage level of the connecting node of the diode D2 and capacitor C3 rises to (Vin+Vcc−Vth) so that a reverse bias voltage is applied on the diode D2 and the diode D2 is cut off. Herein, Vin is the voltage of the input power source VIN, Vcc is voltage of the driving voltage VCC, and Vth is a forward-biased voltage of the diode D2.

When the control signal Si2 is changed to a high level state again, the PNP bipolar transistor S1 and the NPN bipolar transistor S2 are cut off again. The charges in the parasitic capacitance of the high side transistor switch T1 is released via the resistor R3 and the voltage level of the gate of the high side transistor switch T1 is decreased to the voltage level of the connecting node VS, so that the high side transistor switch T1 is cut off. Then, the capacitor C3 is charged through the diode D2, so that the voltage of the capacitor C3 rises to (Vcc−Vth) again.

As described above, when the low side transistor switch T2 is turned on, the high side transistor switch T1 is cut off, and vice versa. Thus, the high side transistor switch T1 and the low side transistor switch T2 are not turned on simultaneously for avoiding the damage due to shoot-through.

In addition, when the high side transistor switch T1 is turned on, the voltage level of the connecting node of the diode D2 and capacitor C3 rises to (Vin+Vcc−Vth). In the embodiment, the diode D2 and the NPN bipolar transistor S2 with sufficient withstand voltage against the voltage of (Vin+Vcc−Vth) are adopted, the voltage withstand of other elements including the controller 100 would only be higher than the driving voltage VCC. As a result, the level of withstand voltage of the controller and most of the elements are decreased so that the manufacturing cost of the circuit is reduced.

Figure 4:
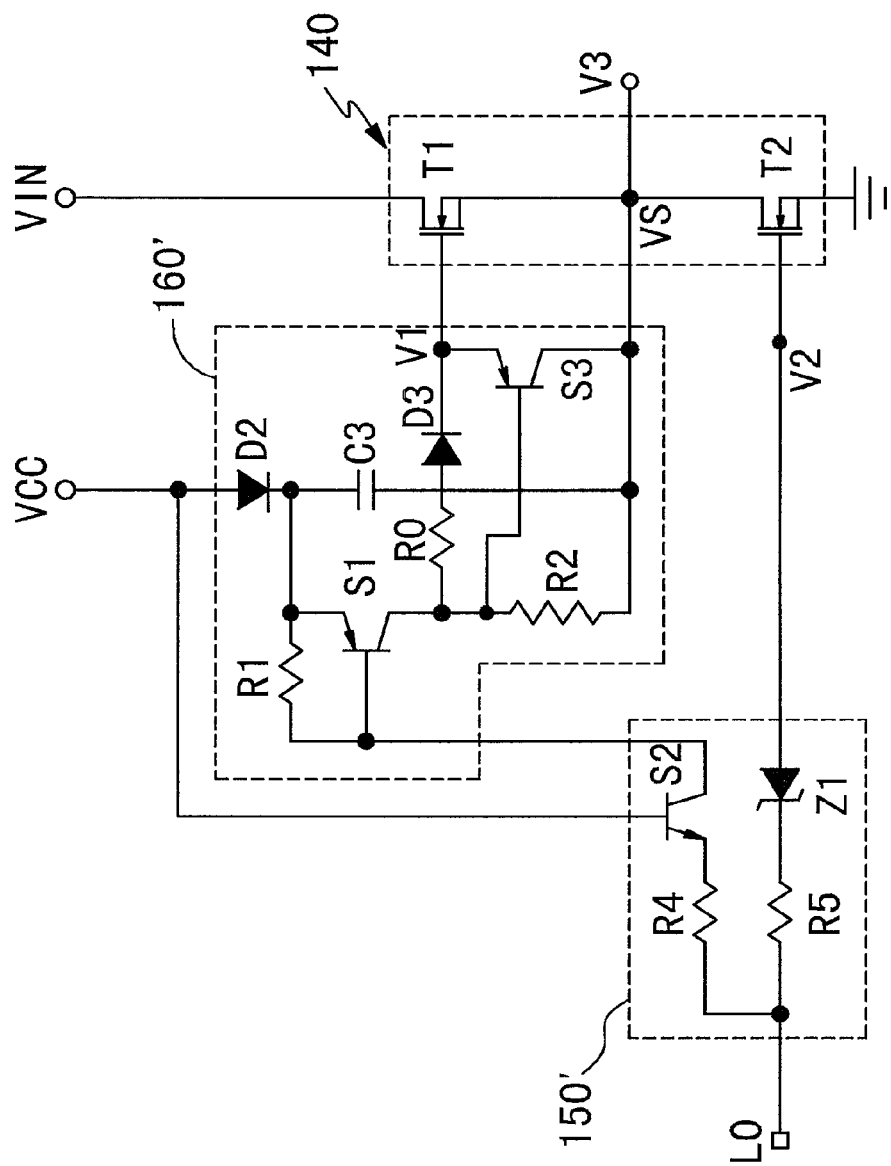
FIG. 4 is a schematic circuit diagram of a level shift driving circuit according to the second embodiment of the invention.

Referring to FIG. 4, FIG. 4 is a schematic circuit diagram of a level shift driving circuit according to the second embodiment of the invention. Compared with the embodiment shown in FIG. 3, the phase adjustment circuit 150' of the embodiment further includes a Zener diode Z1 coupled between the low side transistor switch T2 and the resistor R5. When the control signal Si2 is changed from a low level state to a high level state, a turn-on timing of the low side transistor switch T2 is postponed due to an breakdown voltage of the Zener diode Z1, so that the high side transistor switch T1 and the low side transistor switch T2 are ensured not being turned on at the same time. Moreover, the PNP bipolar transistor S3 of the level shift circuit 160' of the embodiment is substituted for the resistor R3 serving as the second energy release path in FIG. 3, so that the process that the high side transistor switch T1 is changed from a turn-on state to a cut-off state or from a cut-off state to a turn-on state is speeded up. The emitter of the PNP bipolar transistor S3 is connected with the gate of the high side transistor switch T1, the base thereof is connected with the connecting node of the resistor R2 and the PNP bipolar transistor S1, and the collector thereof is connected with the connecting node VS.

Figure 5:
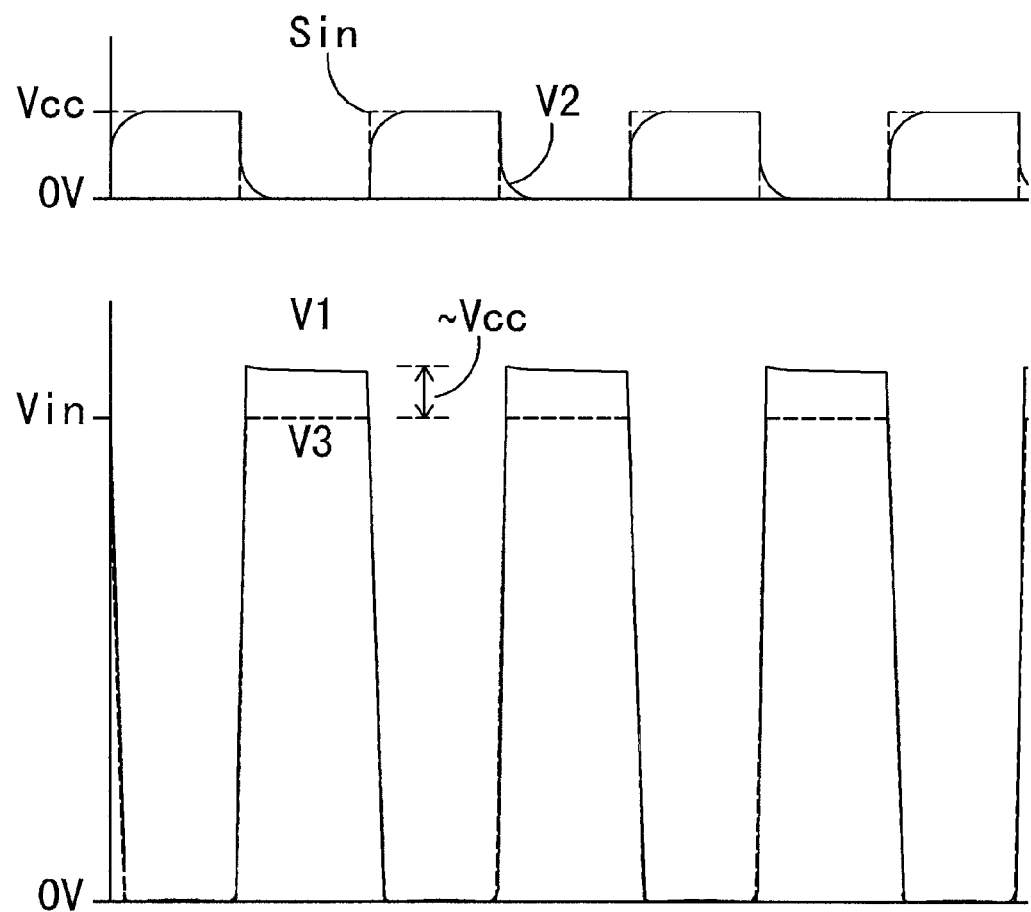
FIG. 5 is a diagram showing a signal waveform of the embodiment shown in FIG. 4.

Referring to both FIG. 4 and FIG. 5, FIG. 5 is a diagram showing a signal waveform of the embodiment shown in FIG. 4. When the control signal Sin (not shown) from the low side pin LO is at a low level state, the voltage level V2 of the gate of the low side transistor switch T2 drops rapidly toward zero. When PNP bipolar transistor S1 and the NPN bipolar transistor S2 are turned on to turn on the high side transistor T1, the voltage level V3 of the connecting node VS rises rapidly to a voltage level close to the voltage level Vin of the input power source VIN. Besides, the voltage level of the gate of the high side transistor switch T1 rises to a voltage level close to (Vin+Vcc) and then is slightly decreased because a few power is provided to turn on the high side transistor switch T1. At this time, the voltage level of the base of the PNP bipolar transistor S3 is higher than the voltage level of the emitter, so that the PNP bipolar transistor S3 is cut off. Compared with the circuit of FIG. 3 in which currents still flow through the resistor R3 on the condition, the power loss of the embodiment is less since no current flowing through the PNP bipolar transistor S3 when the PNP bipolar transistor S3 is cut off.

When the control signal Sin is at a high level state, the voltage level V2 of the gate of the low side transistor switch T2 rises rapidly toward the voltage level Vcc of the driving voltage VCC. Then, the low side transistor switch T2 is turned on, so that the voltage level V3 of the connecting node VS drops rapidly close to zero. The PNP bipolar transistor S1 and the NPN bipolar transistor S2 are cut off. The voltage level of the emitter of the PNP bipolar transistor S3 is pulled down to the voltage level of the connecting node VS by the resistor R2, so that the PNP bipolar transistor S3 is turned on. At this moment, the charges stored in the parasitic capacitance of the high side transistor switch T1 is rapidly released via the PNP bipolar transistor S3, so that the high side transistor switch T1 is able to be cut off rapidly. Besides, when voltage difference between the voltage level V1 of the gate of the high side transistor switch T1 and the voltage level V3 of the connecting node VS is decreased below the forward-biased voltage, the PNP bipolar transistor S3 is cut off and the voltage difference between the voltage level V1 of the gate of the high side transistor switch T1 and the voltage level V3 of the connecting node VS is remained at about the forward-biased voltage Vth (since there is great scale difference between Vth and Vin, Vth is not shown in FIG. 5). As a result, the process in which the high side transistor switch T1 changed from a cut-off state to a turn-on state is speeded up.

Figure 6:
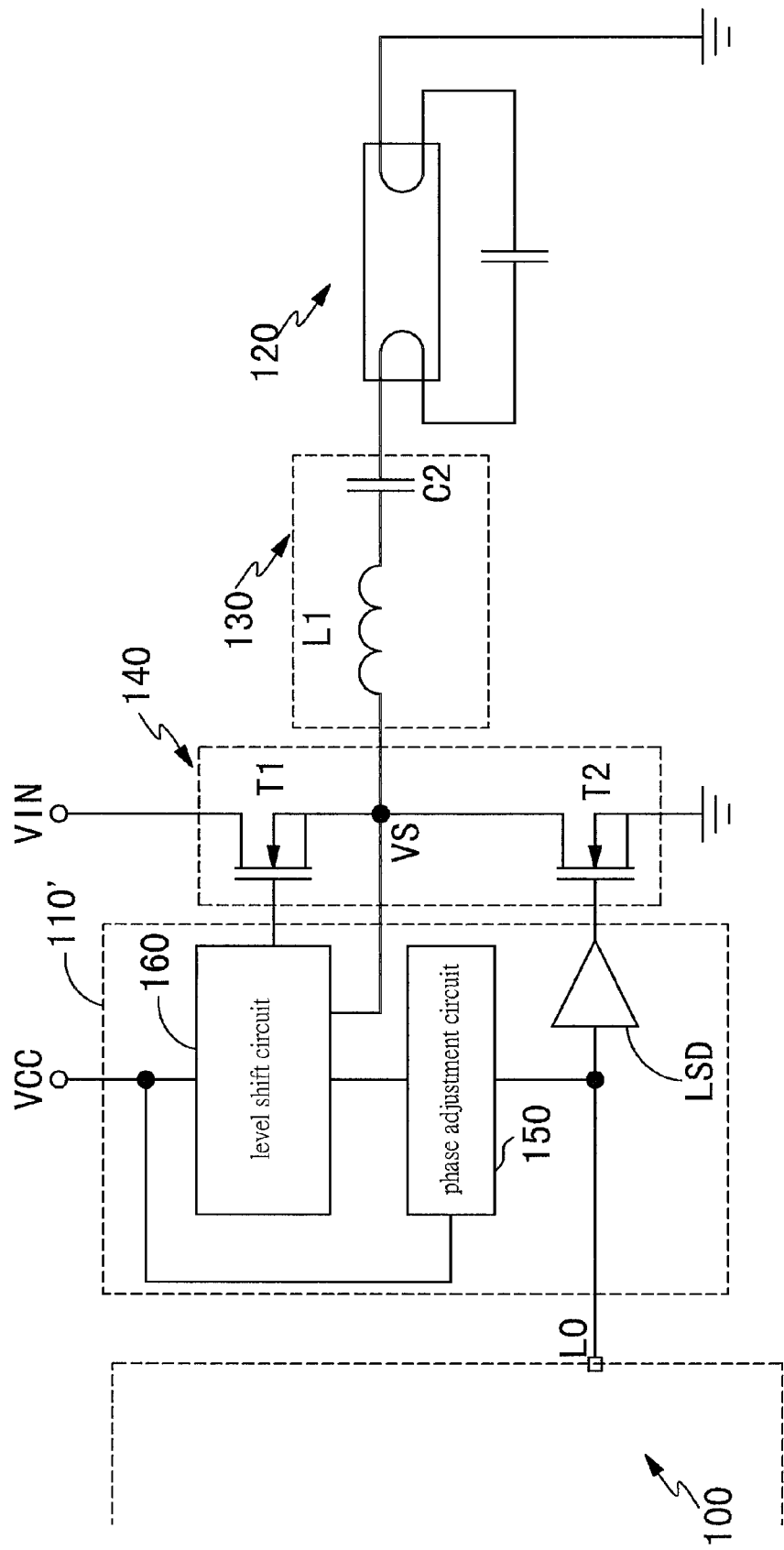
FIG. 6 is a circuit block diagram of a level shift driving circuit of a lamp driving apparatus according to an embodiment of the invention.

In another embodiment, the level shift driving circuit may be integrated into a single chip. FIG. 6 is a circuit block diagram of a level shift driving circuit of a lamp driving apparatus according to an embodiment of the invention. Referring to FIG. 6, the lamp driving apparatus includes a controller 100, a level shift driving circuit 110', a resonant module 130, and a switch module 140 to drive a lamp 120. The level shift driving circuit 110' includes a driving circuit LSD, a phase adjustment circuit 150, and a level shift circuit 160 so as to generate two control signals to control the high side transistor switch T1 and the low side transistor switch T2 according to a control signal of the controller 100. Herein, the driving circuit LSD is used to enhance the driving ability of the control signal output by the controller via the low side driving pin LO. Thus, in various applications, different low side transistor switches T1 can be drive by the driving circuit LSD of the level shift driving circuit 110'.

Figure 7:
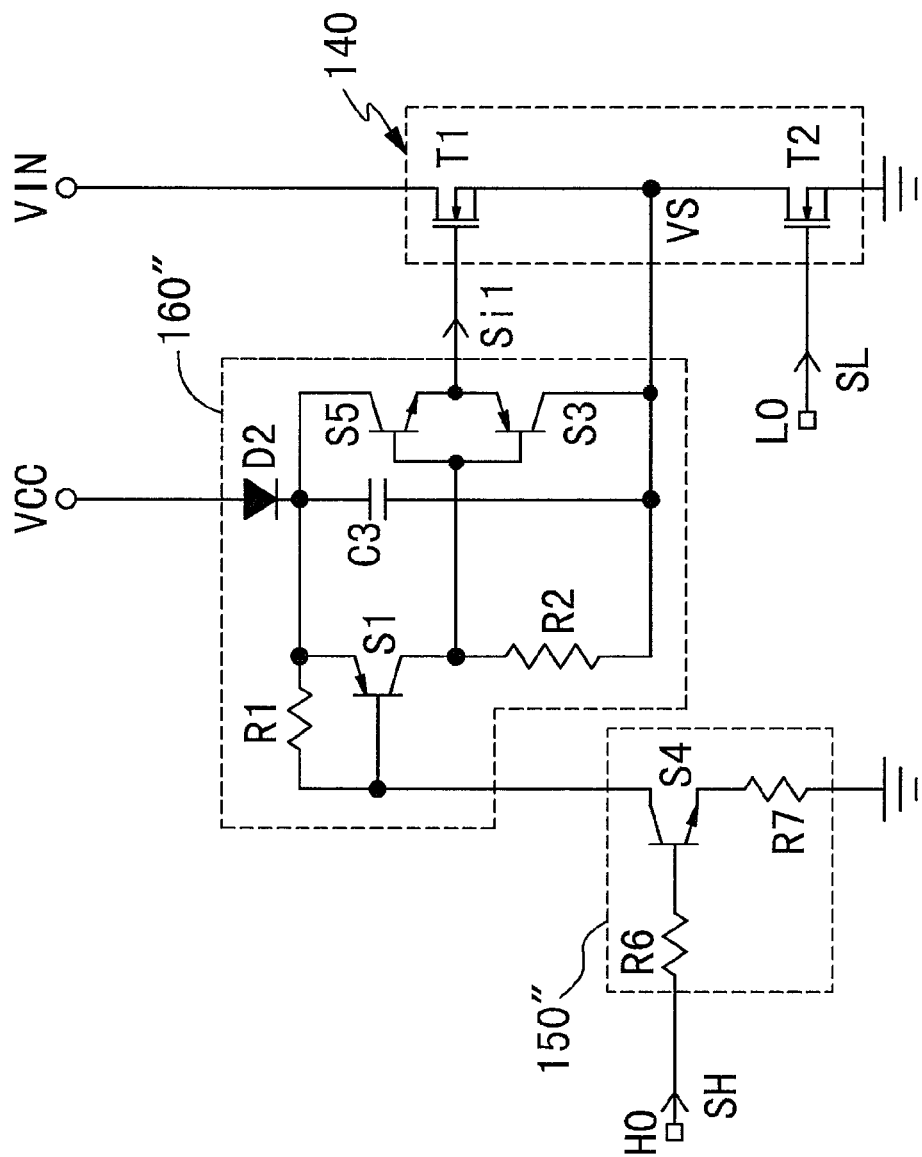
FIG. 7 is a schematic circuit diagram of a level shift driving circuit according to the third embodiment of the invention.

FIG. 7 is a schematic circuit diagram of a level shift driving circuit according to the third embodiment of the invention. Compared with the embodiment shown in FIG. 3, the phase adjustment circuit 150" of the embodiment receives an output signal SH from a high side driving pin HO of the controller.

Besides, the level shift circuit 160" generates the high side driving Si1 to drive the high side transistor switch T1, and the low side transistor switch T2 is directly controlled by an output signal SL from the low side pin LO of the controller. Herein, the phase difference between the output signal SH of the high side driving pin HO and the output signal SL of the low side driving pin LO is 180 degrees. The phase adjustment circuit 150" includes resistors R6 and R7, and an NPN bipolar transistor S4. One end of the resistor R6 is connected with the high side driving pin HO, and another pin of the resistor R6 is connected with a base of the NPN bipolar transistor S4. One end of the resistor R7 is connected with an emitter of the NPN bipolar transistor S4, and another end thereof is connected to a ground. A collector of the NPN bipolar transistor S4 is connected with a base of the PNP bipolar transistor S1 of the level shift circuit 160".

When the output signal SL from the low side driving pin LO is at a low level state, the output signal SH of the high side driving pin HO is at a high level state. At this moment, the low side transistor switch T2 is cut off, and the PNP bipolar transistor S1 and the NPN bipolar transistor S4 are turned on, so that the high side driving signal Si1 is at a high level (with respect to the voltage level of the connecting node VS) causing the conducting of the high side transistor T1. When the output signal SL from the low side driving pin LO is at a high level state, the output signal SH of the high side driving pin HO is at a low level state. At this moment, the low side transistor switch T2 is turned on, and the PNP bipolar transistor S1 and the NPN bipolar transistor S4 are cut off, so that the high side driving signal Si1 is at a low level state (with respect to the voltage level of the connecting node VS) and then the high side transistor T1 is cut off. Thus, even though the phase of the signal SL received by the gate of the low side transistor switch T2 and the phase of the signal SH received by the level shift driving circuit is opposite, the phase difference between the signal received by the high side transistor T1 and the signal received by the low side transistor T2 are still ensured to be opposite, i.e. 180 degrees, after the phase of the signal SH is adjusted by the phase adjustment circuit 150". As a result, the turn-on time of the high side transistor T1 does not overlap with the turn-on time of the low side transistor T2.

Moreover, in the level shift circuit 160" of the embodiment, an NPN bipolar transistor S5 is substituted for the resistor R0 and the diode D3 serving as the first energy release path in FIG. 3, and a PNP bipolar transistor S3 is substituted for the resistor R3 serving as the second energy release path in FIG. 3. When the output signal SL from the low side driving pin LO is at a low level state, the output signal SH of the high side driving pin HO is at a high level state. At this time, the PNP bipolar transistor S1 and the NPN bipolar transistor S4 are turned on. The voltage level of the collector of the PNP bipolar transistor S1 is pulled up, such that the NPN bipolar transistor S5 is turned on and the PNP bipolar transistor S3 is cut off. Thus, the level shift driving circuit 160" outputs the high side driving signal Si1 with a high level state. On the contrary, when the output signal SH of the high side driving pin SH is at a low level state, the PNP bipolar transistor S1 and the NPN bipolar transistor S4 are cut off. At this moment, the voltage level of the collector of the PNP bipolar transistor S1 is pulled down to the voltage level of the connecting node VS by the resistor R2, so that the NPN bipolar transistor S5 is cut off and the PNP bipolar transistor S3 is turned on. Thus, the level shift driving circuit 160" outputs the high side driving signal Si1 with a low level state.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications and variations of this invention if they fall within the scope of the following claims and their equivalents.

What is claimed is:

1. A lamp driving apparatus, comprising:
   a switch module, comprising a high side transistor switch and a low side transistor switch connected in series between an input power source and a common level;
   a controller, adapted to control the high side transistor switch and the low side transistor switch for controlling power of the input power source transmitted through the switch module;
   a resonant module, coupled to the switch module and converting the power from the input power source into an AC output signal so as to drive a lamp;
   a level shift circuit, coupled to the controller, the switch module and a level shift voltage, and generating a high side control signal according to a voltage level of a connecting node of the high side transistor switch and the low side transistor switch, the level shift voltage, and a control signal generated by the controller so as to control the high transistor switch; and
   a phase adjustment circuit coupled between the controller and the level shift circuit, wherein the phase adjustment circuit adjusts the control signal so that a phase difference between the high side control signal and the control signal is equal to a predetermined phase difference value.

2. The lamp driving apparatus as claimed in claim 1, wherein the predetermined phase difference value is 180 degrees.

3. The lamp driving apparatus as claimed in claim 2, wherein the phase adjustment circuit comprises an NPN bipolar transistor, and a collector of the NPN bipolar transistor is coupled to the level shift circuit, a base of the NPN bipolar transistor is coupled to the level shift voltage, and an emitter of the NPN bipolar transistor receives the control signal.

4. The lamp driving apparatus as claimed in claim 1, wherein the phase adjustment circuit comprises an NPN bipolar transistor, and a collector of the NPN bipolar transistor is coupled to the level shift circuit, an emitter of the NPN bipolar transistor is coupled to the common level, and a base of the NPN bipolar transistor receives the control signal.

5. The lamp driving apparatus as claimed in claim 1, wherein the phase adjustment circuit comprises a Zener diode, and a negative end of the Zener diode is coupled to the controller and a positive end of the Zener diode is coupled to a control end of low side transistor switch.

6. A lamp driving apparatus, comprising:
   a switch module, comprising a high side transistor switch and a low side transistor switch connected in series between an input power source and a common level;
   a controller, adapted to control the high side transistor switch and the low side transistor switch for controlling power of the input power source transmitted through the switch module;
   a resonant module, coupled to the switch module and converting the power from the input power source into an AC output signal so as to drive a lamp; and
   a level shift circuit, coupled to the controller, the switch module and a level shift voltage, and generating a high side control signal according to a voltage level of a connecting node of the high side transistor switch and the low side transistor switch, the level shift voltage, and a control signal generated by the controller so as to control the high transistor switch, wherein the level shift circuit comprises an energy storage path, a capacitor, a first energy release path, and a second energy release path, a first end of the energy storage path is coupled to the level shift voltage, a second end of the energy storage path is coupled to a first end of the capacitor, a second end of the capacitor is coupled to the connecting node, a first end of the first energy release path is coupled to the first end of the capacitor, a second end of the first energy release path is coupled to a control end of the high side control signal, a first end of the second energy release path is coupled to the control end of the high side transistor switch, and a second end of the second energy release path is coupled to the connecting node.

7. The lamp driving apparatus as claimed in claim 6, wherein the second energy release path comprises a PNP bipolar transistor to release charges stored in a parasitic capacitor of the high side transistor switch.

8. The lamp driving apparatus as claimed in claim 6, further comprising a low side driving circuit receiving the control signal and generating a low side control signal to control the switching of the low side transistor switch, wherein a turn-on time of the low side transistor switch does not overlap with a turn-on time of the high side transistor switch.

9. The lamp driving apparatus as claimed in claim 6, wherein the first energy release path comprises a diode, a positive end of the diode is coupled to the first end of the capacitor, and a negative end of the diode is coupled to the control end of the high side transistor switch.

10. The lamp driving apparatus as claimed in claim 6, wherein the first energy release path comprises an NPN bipolar transistor to release charges stored in the capacitor so as to turn on the high side transistor switch.

11. A level shift driving circuit for shifting a level of a control signal, comprising: an energy storage path, having a first end coupled to a level shift voltage so as to transmit power of the level shift voltage; an energy storage element, having a first end coupled to a second end of the energy storage path and a second end coupled to a reference level so as to store the power of the level shift voltage; a first energy release path, having a first end coupled to the first end of the energy storage element and a second end coupled to a control end of a first transistor switch so as to turn-on the first transistor switch according to the control signal; and a second energy release path, having a first end coupled to the control end of the first transistor switch, and a second end of the second energy release path is coupled to the reference level to release charges stored in a parasitic capacitor of the first transistor switch so as to turn off the first transistor switch.

12. The level shift driving circuit as claimed in claim 11, further comprising a phase adjustment circuit, coupled to the first energy release path to receive the control signal so as to adjust a phase of the control signal.

13. The level shift driving circuit as claimed in claim 11, further comprising an NPN bipolar transistor, and a collector of the NPN bipolar transistor is coupled to the first energy release path, a base of the NPN bipolar transistor is coupled to the level shift voltage, and an emitter of the NPN bipolar transistor receives the control signal.

14. The level shift driving circuit as claimed in claim 11, further comprising an NPN bipolar transistor, wherein a collector of the NPN bipolar transistor is coupled to the first energy storage path, an emitter of the NPN bipolar transistor is coupled to a common level, and a base of the NPN bipolar transistor receives the control signal.

15. The level shift driving circuit as claimed in claim 11, wherein the second energy release path comprises a PNP bipolar transistor, a collector of the PNP bipolar transistor is coupled to the reference level, an emitter of the PNP bipolar transistor is coupled to the control end of the first transistor switch, and a base of the PNP bipolar transistor is coupled to the first energy release path.

16. The level shift driving circuit as claimed in claim 15, wherein the first energy release path comprises an NPN bipolar transistor, a collector of the NPN bipolar transistor is coupled to the first end of the energy storage element, an emitter of the first transistor is coupled to the control end of the first transistor switch, and a base of the NPN bipolar transistor is coupled to the base of the PNP bipolar transistor.

17. The level shift driving circuit as claimed in claim 11, further comprising a driving circuit for controlling a switching of a second transistor switch, wherein the first transistor switch and the second transistor switch are connected in series and a turn-on time of the first transistor switch does not overlap with a turn-on time of the second transistor switch.

18. The level shift driving circuit as claimed in claim 11, wherein the first energy release path comprises a diode, a positive end of the diode is coupled to the first end of the energy storage element, and a negative end of the diode is coupled to the control end of the first transistor switch.

* * * * *